(12) United States Patent
Hauser et al.

(10) Patent No.: US 11,509,161 B2
(45) Date of Patent: *Nov. 22, 2022

(54) METHOD FOR CONTROLLING AN ACCUMULATOR ON A CHARGING DEVICE

(71) Applicant: Hilti Aktiengesellschaft, Schaan (LI)

(72) Inventors: Klaus Hauser, Schwabmuenchen (DE); Stefan Mayer, Dachau (DE); David Koscheck, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 324 days.

This patent is subject to a terminal disclaimer.

(21) Appl. No.: 16/644,241

(22) PCT Filed: Aug. 27, 2018

(86) PCT No.: PCT/EP2018/073000
§ 371 (c)(1),
(2) Date: Mar. 4, 2020

(87) PCT Pub. No.: WO2019/048277
PCT Pub. Date: Mar. 14, 2019

(65) Prior Publication Data
US 2021/0066944 A1 Mar. 4, 2021

(30) Foreign Application Priority Data

Sep. 7, 2017 (EP) .................. 17189739

(51) Int. Cl.
*H02J 7/04* (2006.01)
*H02J 7/00* (2006.01)
*H02J 13/00* (2006.01)

(52) U.S. Cl.
CPC ............ *H02J 7/04* (2013.01); *H02J 7/00036* (2020.01); *H02J 7/0071* (2020.01);
(Continued)

(58) Field of Classification Search
CPC .......................... H02J 7/00036; H02J 7/0036
See application file for complete search history.

(56) References Cited

U.S. PATENT DOCUMENTS 5,864,224 A * 1/1999 Takechi ............... H01M 10/443
320/152
5,982,148 A * 11/1999 Mercer ................. H02J 7/0069
320/164

(Continued)

FOREIGN PATENT DOCUMENTS

CN 107919702 A * 4/2018 ............ H02J 7/0036
JP H05122859 5/1993

OTHER PUBLICATIONS

Li, Fu-Yan; CN107919702A translation of the description; published Apr. 17, 2018 (Year: 2018).*

(Continued)

*Primary Examiner* — Drew A Dunn
*Assistant Examiner* — Pamela J Jeppson
(74) *Attorney, Agent, or Firm* — Davidson, Davidson & Kappel, LLC

(57) ABSTRACT

Charging an accumulator having an energy storage cell, a data interface and a wake-up circuit. A charging apparatus contains a data interface, a controller, a timer and a switch apparatus. The data interfaces connected to one another via a communication line for differential communication between the accumulator and charging apparatus. Setting the timer to a predetermined period of time; setting the control electronics of the accumulator to a deactivation mode;

(Continued)

sending at least one signal from the charging apparatus to the accumulator via the communication line after the predetermined period of time has elapsed; activating the wake-up circuit for activating control electronics by detecting a voltage value from the communication line, the voltage value is consistent with either the dominant or recessive state of the communication line; setting the control electronics to an activation mode; and requesting or releasing a charging current from the charging apparatus using the accumulator.

15 Claims, 2 Drawing Sheets

(52) U.S. Cl.
CPC .... *H02J 7/00712* (2020.01); *H02J 7/007194* (2020.01); *H02J 7/00032* (2020.01); *H02J 7/00306* (2020.01); *H02J 7/00309* (2020.01); *H02J 13/00006* (2020.01); *H02J 2207/50* (2020.01)

(56) References Cited

U.S. PATENT DOCUMENTS

| | | | |
|---|---|---|---|
| 2008/0143292 A1* | 6/2008 | Ward | B60L 8/003 320/101 |
| 2016/0056655 A1* | 2/2016 | Kaneda | H02J 7/0016 320/136 |
| 2018/0277801 A1* | 9/2018 | Brozek | H02J 7/0021 |
| 2020/0280106 A1* | 9/2020 | Hauser | B25B 21/00 |

OTHER PUBLICATIONS

International Search Report of PCT/EP2018/073000, dated Oct. 29, 2018.

Wasson et al.:"Basics of Battery Charging for Battery Longevity," Battery Systems—The Single Solution!, May 31, 2017, downloaded from https://www.batterysystems.net/basics-of-battery-charging-for-battery-longevity/ on Dec. 16, 2019.

* cited by examiner

METHOD FOR CONTROLLING AN ACCUMULATOR ON A CHARGING DEVICE

The present invention relates to a method for charging an accumulator by means of a charging apparatus, wherein the accumulator contains at least one energy storage cell, a first data interface and a wake-up circuit for activating control electronics of the accumulator, and the charging apparatus contains a second data interface, a controller, a timer and a switch apparatus, and wherein the data interfaces are connected to one another via a first and a second communication line for differential communication between the accumulator and the charging apparatus.

In addition, the present invention relates to a system containing an accumulator and a charging apparatus for performing the method according to the invention, wherein the accumulator contains at least one energy storage cell, a first data interface and a wake-up circuit for activating control electronics of the accumulator, and the charging apparatus contains a second data interface, a controller, a timer and a switch apparatus, and wherein the data interfaces are connected to one another via a communication line for differential communication between the accumulator and the charging apparatus.

Furthermore, the present invention relates to an accumulator for performing the method, wherein the accumulator contains at least one energy storage cell, a first data interface and a wake-up circuit for activating control electronics of the accumulator.

Further, the present invention relates to a charging apparatus for performing the method, wherein the charging apparatus contains a second data interface, a controller, a timer and a switch apparatus.

BACKGROUND

To store electrical energy in an accumulator (also called storage battery), the accumulator is connected to a mains-operated charging apparatus (also charger). Electrical energy in the form of a charging current flows through the charging apparatus to the accumulator and in particular to the individual storage battery cells of the accumulator.

The charging of an accumulator by means of the charging apparatus can be problematic, however, if the accumulator is almost completely discharged (i.e. less than 20% of the rated capacity) and additionally too hot (i.e. above 45° C.). A relatively long charging process, in which the accumulator is supposed to be almost completely charged again (i.e. more than 70% of the rated capacity), additionally increases the already critical temperature of the accumulator in this case. This problem arises in particular if the accumulator has been used intensively, i.e. with a long and high flow of current, as an energy source for a machine tool.

In order to protect the accumulator against possible damage when charging by means of the charging apparatus, the accumulator should be cooled before recharging and brought to below 45° C.

Possibly, however, a user does not detect the excessive temperature of an accumulator, which means that the excessively hot accumulator is recharged without appropriate cooling. Damage to the accumulator is possible as a result.

SUMMARY OF THE INVENTION

It is an object of the present invention to provide a method for charging an accumulator by means of a charging apparatus that allows the aforementioned problems to be solved.

In addition, it is an object of the present invention to provide a system containing an accumulator and a charging apparatus for performing the method that allows the aforementioned problem to be solved. Furthermore, it is an object of the present invention to provide an accumulator and a charging apparatus in order to solve the aforementioned problem.

The present invention provides a method for charging an accumulator by means of a charging apparatus, wherein the accumulator contains a wake-up circuit for waking control electronics of the accumulator, the charging apparatus contains a controller, a timer and a switch apparatus and wherein there is provision for a CAN data bus for differential communication between the accumulator and the charging apparatus.

According to the invention, the method contains the following method steps:

setting the timer to a predetermined period of time;
 setting the control electronics of the accumulator to a deactivation mode, so that no charging current flows from the charging apparatus to the accumulator and no current flows from the at least one energy storage cell to the control electronics of the accumulator;
 sending at least one signal from the charging apparatus to the accumulator via the first and second communication lines after the predetermined period of time has elapsed;
 activating the wake-up circuit for activating control electronics by detecting a voltage value from the communication line, wherein the voltage value is consistent with either the dominant or recessive state of the first or second communication line;
 setting the control electronics to an activation mode by means of the wake-up circuit; and
 requesting or releasing a charging current from the charging apparatus by means of the accumulator.

The effect that can be achieved thereby is that the accumulator can initially cool for a certain period of time before a charging process, even though it is already connected to the charging apparatus. As a result, the user does not need to check the accumulator for an excessive temperature and if need be initially cool the accumulator before the accumulator is connected to the charging apparatus to charge the accumulator. The setting of the timer in this case allows the charging process to begin automatically after the accumulator has had a certain time for cooling or has reached a certain temperature again. The cooling is achieved in particular in that the accumulator, after having been connected to the charging apparatus to recharge, is initially put into a switched-off mode or idle mode in which the control electronics of the accumulator are switched off and hence no further heat is generated in the accumulator. Additionally, no electric current flows from the energy storage cells to the control electronics either, which means that an energy storage cell that is already heavily discharged is not discharged further and possible damage to the approximately completely discharged energy storage cell can be avoided. As a result of the control electronics also not being supplied with electric current by the energy storage cells of the accumulator and consequently also not being activated thereby, the control electronics also cannot heat further.

The requesting or releasing of a charging current means that the accumulator is capable of receiving a charging current at a predetermined maximum current intensity from the charging apparatus. To this end, either an appropriate signal is sent from the accumulator to the charging apparatus indicating that a charging current at a maximum possible current intensity is supposed to flow to the accumulator, or the accumulator is capable, by measuring the current intensity of a charging current sent from the charging apparatus to the accumulator, of allowing the charging current to flow to the energy storage cells if the charging current has a current intensity below the maximum possible current intensity.

Optionally, the charging apparatus may be configured with a fan in order to cool the accumulator as appropriate before the actual charging process and after the timer has been set.

In accordance with an advantageous configuration of the present invention, it may be possible for the method step of setting the control electronics of the accumulator to a deactivation mode, so that no charging current flows from the charging apparatus to the accumulator, to be followed by a separate wake-up function of the charging apparatus for waking or activating the control electronics of the accumulator being deactivated. The deactivation of the wake-up function prevents the accumulator from being put back into an activation mode from the deactivation mode early. The accumulator's being activated or reactivated too early means that sufficient cooling of the accumulator cannot be ensured, for example.

In accordance with a further advantageous embodiment of the present invention, it may be possible for the method step of setting the timer to a predetermined period of time to be followed by a cooling apparatus being activated in order to cool parts of the accumulator and/or parts of the charging apparatus. The cooling apparatus can be a fan that is positioned in the charging apparatus such that ambient air for cooling can flow onto parts of the accumulator and/or parts of the charging apparatus. Alternatively, it may be advantageous for the cooling apparatus to be positioned in the accumulator in order to cool parts of the accumulator and/or parts of the charging apparatus.

In addition, the present invention provides a system containing an accumulator and a charging apparatus for performing the method, wherein the accumulator contains at least one energy storage cell, a first data interface and a wake-up circuit for activating control electronics of the accumulator, and the charging apparatus contains a second data interface, a controller, a timer and a switch apparatus, and wherein the data interfaces are connected to one another via a communication line for differential communication between the accumulator and the charging apparatus.

Furthermore, the present invention provides accumulator for performing the method, wherein the accumulator contains at least one energy storage cell, a first data interface and a wake-up circuit for activating control electronics of the accumulator.

In addition, the present invention provides a charging apparatus for performing the method, wherein the charging apparatus contains a second data interface, a controller, a timer and a switch apparatus.

Further advantages emerge from the description of the figures that follows. The figures depict various exemplary embodiments of the present invention. The figures, the description and the claims contain numerous features in combination. A person skilled in the art will expediently also consider the features individually and combine them to produce useful further combinations.

BRIEF DESCRIPTION OF THE DRAWINGS

In the figures.

DETAILED DESCRIPTION

Figure 1:
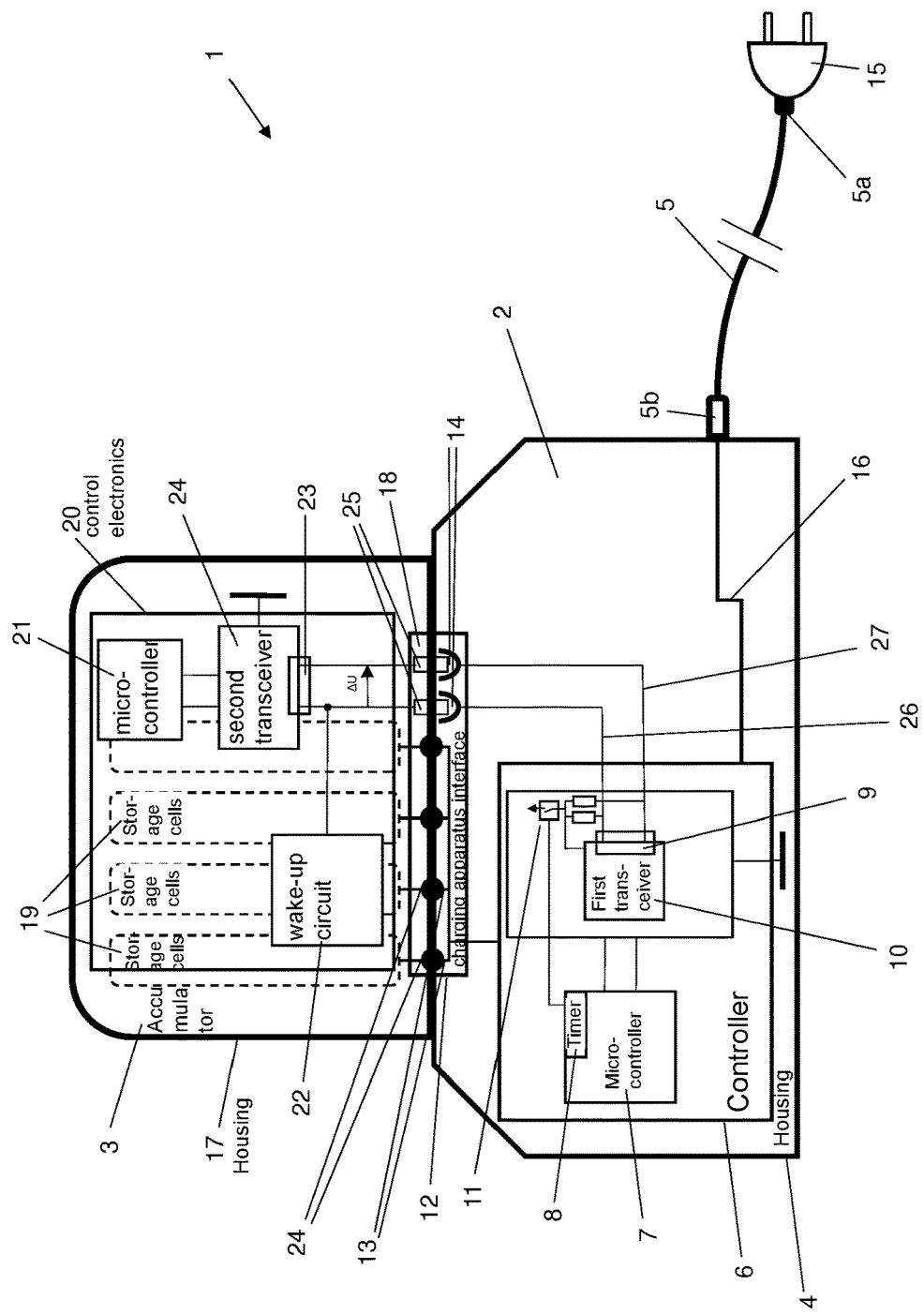
FIG. 1 shows a cross-section through an accumulator and a charging apparatus.
Figure 2:
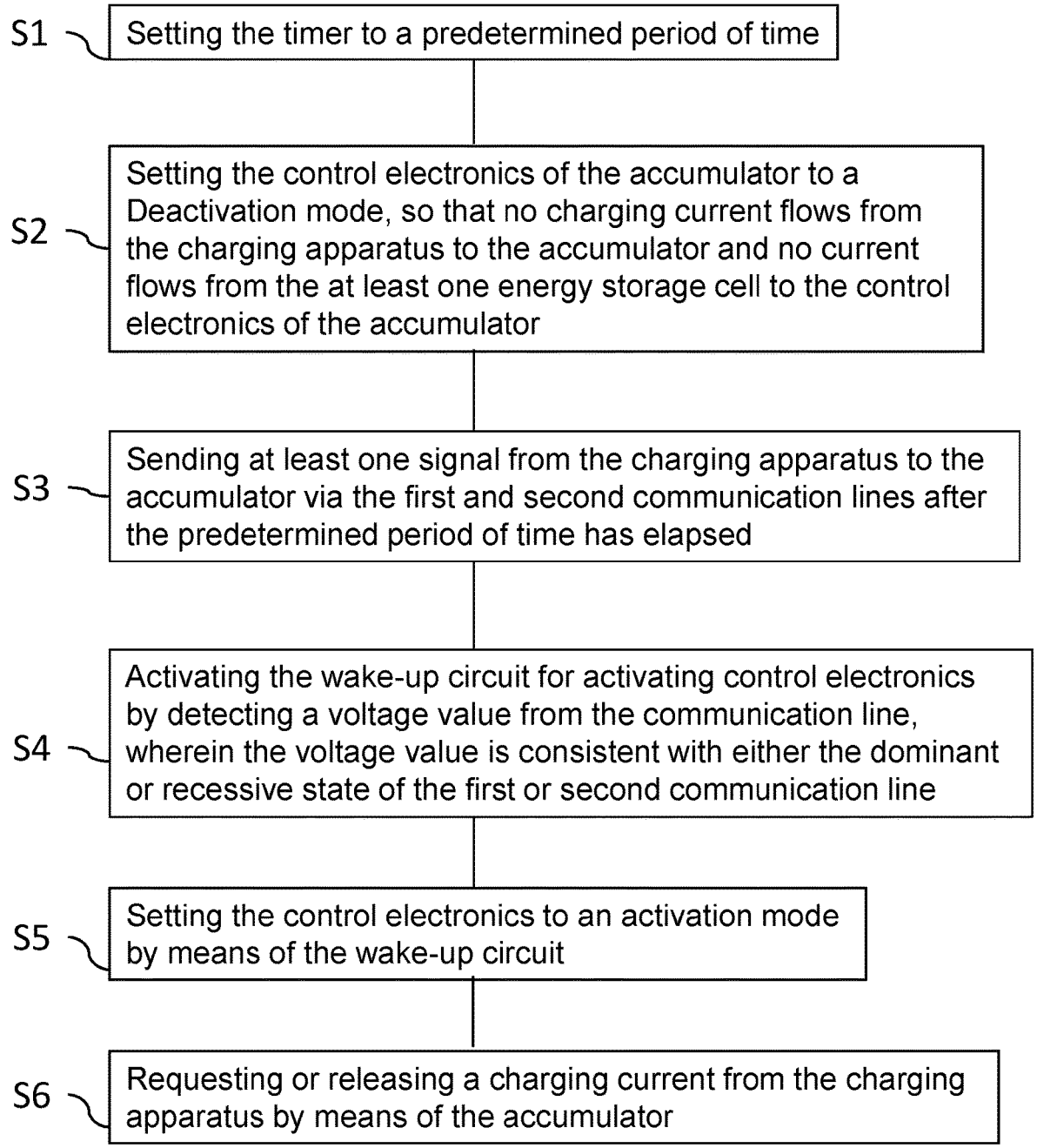
FIG. 2 shows the method steps of the invention.

FIG. 1 depicts a system 1 according to the invention having a charging apparatus 2 and an accumulator 3. The accumulator 3 is connected to the charging apparatus 2 for a charging process. A charging process involves electric current flowing from the charging apparatus 2 to the accumulator 3 in order to store an electrical energy in the form of an electrical charge in the accumulator 3. A charged accumulator 3 can be used as an energy source by a machine tool, such as e.g. a rechargeable screwdriver, a drill or the like. To this end, the accumulator 3 is detached from the charging apparatus 2 and electrically connected to an applicable machine tool. The machine tool is not depicted in the figure.

The charging apparatus 2 substantially contains a housing 4 with a power cable 5, which is used to electrically connect the charging apparatus 2 to a mains power source (also called a socket). The mains power source is not depicted in the figure.

The housing 4 of the charging apparatus 2 contains, inter alia, a controller 6 having a microcontroller 7 (also referred to as MCU), a timer 8, a data interface 9 having a first transceiver 10 and a switch apparatus 11.

The controller 6 is used to control and regulate a charging process. The data interface 9 of the charging apparatus 2 is one of a total of two data interfaces that each parts of a communication system between the charging apparatus 2 and the accumulator 3 connected to the charging apparatus 2. The second data interface 23 is contained in the accumulator 3 and is described below.

The communication system is based on differential communication. In the present exemplary embodiment, the communication system is a CAN data bus. However, it is also possible for another suitable communication system to be able to be used.

On a top of the housing 4, there is provision for a charging apparatus interface 12. The charging apparatus interface 12 contains a number of power connections 13 for transferring electric current and data connections 14 for sending and receiving signals between the charging apparatus 2 and the accumulator 3.

The power cable 5 contains a first end 5a and a second end 5b. The first end 5a of the power cable 5 has a connector 15 and is used for detachably connecting the charging apparatus 2 to a mains power source. The second end 5b of the power cable 5 is connected to the housing 4 of the charging apparatus 2 and via a line 16 to the controller 6 of the charging apparatus 2, so that electric current can flow from the mains power source (not shown) to the controller 6. Routed from the controller 6 are further lines 16 to the power connections 13, in order to provide electric current on the power connections 13.

The accumulator 3 substantially contains a housing 17 having a storage battery interface 18.

The housing 17 of the accumulator 3 contains a multiplicity of energy storage cells 19 and control electronics 20 having a microcontroller 21 and a wake-up circuit 22. The wake-up circuit 22 is used to set the control electronics 20 to an activation mode from a deactivation mode. In other words: the wake-up circuit 22 wakes the control electronics 20 again after they have gone to sleep.

In addition, the accumulator 3 contains a data interface 23 having a second transceiver 24. The data interface 23 of the accumulator 3 is likewise part of the communication system between the charging apparatus 2 and the accumulator 3 connected to the charging apparatus 2. As already mentioned above, the communication system is based on differential communication. In the present exemplary embodiment, the communication system is a CAN data bus.

The energy storage cells 19 can also be referred to as storage battery cells and are used to draw, store and provide electrical energy.

The storage battery interface 18 is positioned on one side of the housing 17. The storage battery interface 18 contains a number of power connectors 24 for drawing electric current and data connectors 25 for sending and receiving signals between the charging apparatus 2 and the accumulator 3. The power connector 24 can be used to route the electric current to the energy storage cells 19.

As shown in FIG. 1, the power connectors 24 of the accumulator 3 are connected to the power connections 13 of the charging apparatus 2. Similarly, the data connectors 25 of the accumulator 3 are connected to the data connections 14 of the charging apparatus 2.

The connection allows electric current for charging the energy storage cells 19 to flow from the mains power source via the charging apparatus 2 to the accumulator 3. In addition, signals for differential communication between the accumulator 3 and the charging apparatus 2 can be exchanged.

The differential communication between the accumulator 3 and the charging apparatus 2 is effected via a first and a second communication line 26, 27 between the data interface 23 of the accumulator 3 and data interface 9 of the charging apparatus 2. In the present exemplary embodiment, the respective data interfaces 23, 9 are each equipped with a CAN transceiver.

As indicated in FIG. 1, the first and second communication lines 26, 27 for the differential communication between the accumulator 3 and the charging apparatus 2 are each connected to the first transceiver 10 and the second transceiver 24. In the exemplary embodiment, the communication system is configured as a CAN data bus, for example. The first communication line 26 is configured as a COM-High line and the second communication line 27 is configured as a COM-Low line in the depicted CAN data bus. The first communication line 26, configured as COM-High or a COM-High line, has a voltage value of 3.5 volts in a dominant state. By contrast, the second communication line 27, configured as COM-Low or a COM-Low line, has a voltage value of 1.5 volts in a dominant state. In a recessive state, the voltage value of the first communication line 26 configured as COM-High and of the second communication line 27 configured as COM-Low is 2.5 volts. However, it is also possible for the voltage value to be higher or lower than 1.5 or 3.5 volts in the respective dominant state and for the voltage value to be higher or lower than 2.5 volts in the recessive state. The voltage value is not lower than 0.9 volt in the recessive state, however.

As can likewise be seen in FIG. 1, the wake-up circuit 22 of the accumulator 3 is connected to the first communication line 26 configured as COM-High. Alternatively, the wake-up circuit 22 of the accumulator 3 may be connected to the second communication line 26 configured as COM-Low.

If the accumulator 3 becomes too hot before and/or during a charging process, i.e. exceeds a predetermined threshold value for a temperature for the accumulator 3, an applicable signal is sent from the accumulator 3 to the timer 8 in the charging apparatus 2 via the data interface 23. The signal activates the timer 8, so that after a specific period of time (also referred to as countdown) a signal is sent from the timer 8 to the switch apparatus 11. The period of time can be between 20 and 200 seconds, for example. The length of the period of time is dependent on the temperature reached in the accumulator 3. The higher the temperature of the accumulator 3, the longer the period of time.

After the timer 8 has been activated, the charging process is interrupted by the control electronics 20 of the accumulator 3. The temperature monitoring is effected by means of an NTC thermistor (also called NTC resistor), not shown, which is positioned in the accumulator 3. During the interruption to the charging process, no charging current flows from the charging apparatus 2 to the energy storage sells 19 of the accumulator 3. In addition, no current flows from the energy storage cells 19 to the control electronics 20 of the accumulator 3 either. The interruption takes place after an applicable signal has been sent from the control electronics 20 to the controller 6 of the charging apparatus 2 via the first and second communication lines 26, 27.

Following the interruption to the charging process, the control electronics 20 of the accumulator 3 are put into a deactivation mode, as a result of which all the electronics of the accumulator 3 are switched off and make no further contribution to heating the accumulator 3.

After the charging process has been interrupted, as a result of which no further current flows to the energy storage cells 19 or the control electronics 20 and the accumulator 3 is in the deactivation mode, the accumulator 3 is not heated further and can cool. In order to additionally speed up the cooling, a fan (not shown) is activated in order to allow relatively cool ambient air to flow through the accumulator 3.

As already mentioned above, after the selected period of time (e.g. 100 seconds) has elapsed, a signal is sent from the timer 8 to the switch apparatus 11 of the charging apparatus 2. The switch apparatus 11 activates the data interface 9 having the first transceiver 10 of the charging apparatus 2, so that a signal (e.g. one bit) is sent from the transceiver 10 of the charging apparatus 2 to the data interface 23 having the second transceiver 24 of the accumulator 3 via the first and second communication lines 26, 27. To activate the data interface 9 of the charging apparatus 2, a 5-volt voltage is applied to the switching apparatus 11. However, it is also possible for more or fewer than 5 volts to be necessary for activating the data interface 9 of the charging apparatus 2.

To send a signal in the form of one bit via the communication system, both the COM-High line 26 and the COM-Low line 27 are put into a dominant state. The wake-up circuit 22 of the accumulator 3 is connected to the COM-High line 26. To set the control electronics 20 of the accumulator 3 back to an activation mode from the deactivation mode, the wake-up circuit 22 of the accumulator 3 requires a voltage of at least 0.9 volt. To supply an adequate voltage to the wake-up circuit 22, the voltage value from the COM-High line 26 in the dominant state of the communication system configured as a CAN data bus is sent to the wake-up circuit 22. The voltage value of the COM-High line 26 in a dominant state is 3.5 volts, so that a sufficiently high voltage is available for activating the wake-up circuit 22. Alternatively, it is also possible for the voltage value of 1.5 volts of the COM-Low or second communication line 27 to be used for supplying adequate voltage (i.e. higher than 0.9 volt) to the wake-up circuit 22. For this purpose, the wake-up circuit 22 is connected to the COM-Low or second communication line 27.

After the voltage value of the COM-High line or first communication line 26 in the dominant state has been detected, the wake-up circuit 22 puts the control electronics 20 of the accumulator 3 back into the activation mode from the deactivation mode. The same applies if, in an alternative configuration, the wake-up circuit 22 is connected to the COM-Low or second communication line 27. In the activation mode, a signal is sent from the control electronics 20 to the controller of the charging apparatus 2, as a result of which the charging process for the energy storage cells 19 is continued. Continuation of the charging process means that the accumulator 3 requests the charging current flowing from the charging apparatus 2 to the accumulator 3 at an applicable current intensity or releases the charging current provided by the charging apparatus 2 at the correct current intensity.

In accordance with an alternative configuration, it may also be possible for the timer 8, after the predetermined period of time has elapsed, to send a signal to the data interface 9 of the charging apparatus 2, whereupon the communication system configured as a CAN data bus does not put the COM-High line 26 into a dominant state. Instead, the communication system configured as a CAN data bus is merely activated such that the COM-High line 26 is in a recessive state. Since the voltage value of the COM-High line is 2.5 volts, the recessive state of the COM-High line 26 can also already be used, in accordance with the method described above, for activating the wake-up circuit 22 of the accumulator 3. The same applies if the wake-up circuit 22 of the accumulator 3 is connected to the COM-Low line 27.

If, after the charging process restarts, the temperature of the accumulator 3 is still above a critical threshold value, the process described above can be repeated. The charging process is interrupted again and the accumulator 3 is deactivated again for a specific period of time. To reactivate the accumulator 3 or the control electronics 20 after the period of time, the timer 8 is set accordingly. The period of time set on the timer 8 can be varied in this case. As such, a period of time corresponding to half the most recently set period of time can be chosen for a repeat interruption for cooling. The length of the selected period of time is dependent on the temperature of the accumulator 3 at the beginning of the interruption.

Alternatively, the voltage value of the COM-High line or first communication line 26 in the recessive state can also be detected in order to activate the wake-up circuit 22 of the accumulator 3. In this instance, a voltage of 2.5 volts from the COM-High line or first communication line 26 is sent to the wake-up circuit 22. Since activating the wake-up circuit 22 requires a voltage higher than 0.9 volt, the voltage value of the COM-High line or first communication line 26 in the recessive state is also sufficient.

According to another alternative, the voltage value of the COM-Low line or second communication line 27 in the recessive state can also be detected in order to activate the wake-up circuit 22 of the accumulator 3. In this case too, the voltage value is higher than 0.9 volt, namely likewise 2.5 volts.

According to the invention, the method contains the following method steps:
setting the timer to a predetermined period of time S1;
setting the control electronics of the accumulator to a deactivation mode, so that no charging current flows from the charging apparatus to the accumulator and no current flows from the at least one energy storage cell to the control electronics of the accumulator S2;
sending at least one signal from the charging apparatus to the accumulator via the first and second communication lines after the predetermined period of time has elapsed S3;
activating the wake-up circuit for activating control electronics by detecting a voltage value from the communication line, wherein the voltage value is consistent with either the dominant or recessive state of the first or second communication line S4;
setting the control electronics to an activation mode by means of the wake-up circuit S5; and
requesting or releasing a charging current from the charging apparatus by means of the accumulator S6.

What is claimed is:

1. A method for charging an accumulator via a charging apparatus, the accumulator having at least one energy storage cell, a first data interface and a wake-up circuit for activating control electronics of the accumulator, and the charging apparatus having a second data interface, a controller, a timer and a switch apparatus, the first and second data interfaces being connected to one another via a first communication line and a second communication line for differential communication between the accumulator and the charging apparatus, the method comprising the steps of:
setting the timer to a predetermined period of time;
setting the control electronics of the accumulator to a deactivation mode, so that no charging current flows from the charging apparatus to the accumulator and no current flows from the at least one energy storage cell to the control electronics of the accumulator;
sending at least one signal from the charging apparatus to the accumulator via the first and second communication lines after the predetermined period of time has elapsed;
activating the wake-up circuit for activating control electronics by detecting a voltage value from the first or second communication line, wherein the voltage value is consistent with either a dominant or recessive state of the first or second communication line;
setting the control electronics to an activation mode via the wake-up circuit; and
requesting or releasing a charging current from the charging apparatus via the accumulator.

2. A system for performing the method as recited in claim 1 and comprising:
comprising the accumulator and the charging apparatus;
the accumulator including the at least one energy storage cell, the first data interface and the wake-up circuit for activating the control electronics of the accumulator, and
the charging apparatus including the second data interface, the controller, the timer and the switch apparatus, the first and second data interfaces being connected to one another via the first and the second communication lines for differential communication between the accumulator and the charging apparatus.

3. The accumulator for performing the method as recited in claim 1 in conjunction with the charging apparatus, the accumulator comprising:
the at least one energy storage cell, the first data interface and the wake-up circuit for activating the control electronics of the accumulator.

4. The charging apparatus for performing the method as recited in claim 1 in conjunction with the accumulator, the charging apparatus comprising:
the second data interface, the controller, the timer and the switch apparatus.

5. The method as recited in claim 1 wherein the charging apparatus contains a housing with a power cable.

6. The method as recited in claim 5 wherein the housing contains the controller, the timer and the switch apparatus.

7. The method as recited in claim 5 wherein the power cable contains a first end and a second end.

8. The method as recited in claim 7 wherein the first end has a connector for detachably connecting the charging apparatus to power.

9. The method as recited in claim 7 wherein the second end is connected to the housing.

10. The method as recited in claim 9 wherein the first communication line is a Controller Area Network (CAN) high line, and the second communication line is a CAN low line.

11. The method as recited in claim 10 wherein the wake-up circuit is connected to the first communication line.

12. The method as recited in claim 1 wherein the wake-up circuit is connected to the first communication line.

13. The method as recited in claim 1 wherein the predetermined period of time is between 20 and 200 seconds.

14. The method as recited in claim 13 wherein the predetermined period of time is dependent on a temperature of the accumulator.

15. The method as recited in claim 14 wherein the predetermined period of time is longer the higher the temperature of the accumulator.

* * * * *